Sept. 26, 1950

R. N. HARVEY 2,523,569

TRAILER HEATER

Filed Dec. 10, 1948

INVENTOR.
Rufus N. Harvey
BY Buckhorn and Cheatham
Attorneys

Sept. 26, 1950  R. N. HARVEY  2,523,569
TRAILER HEATER
Filed Dec. 10, 1948  2 Sheets-Sheet 2
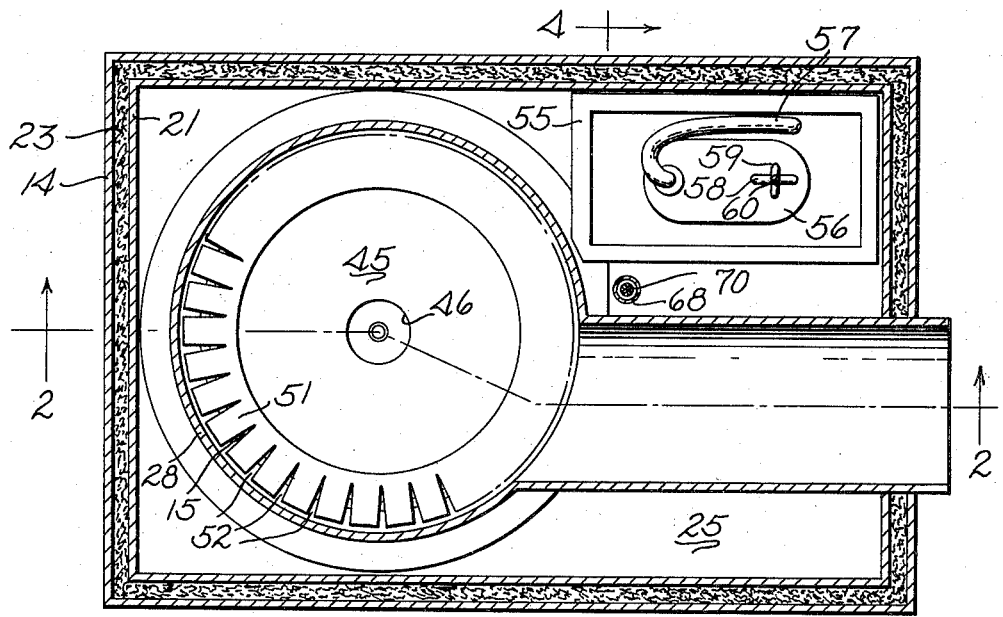
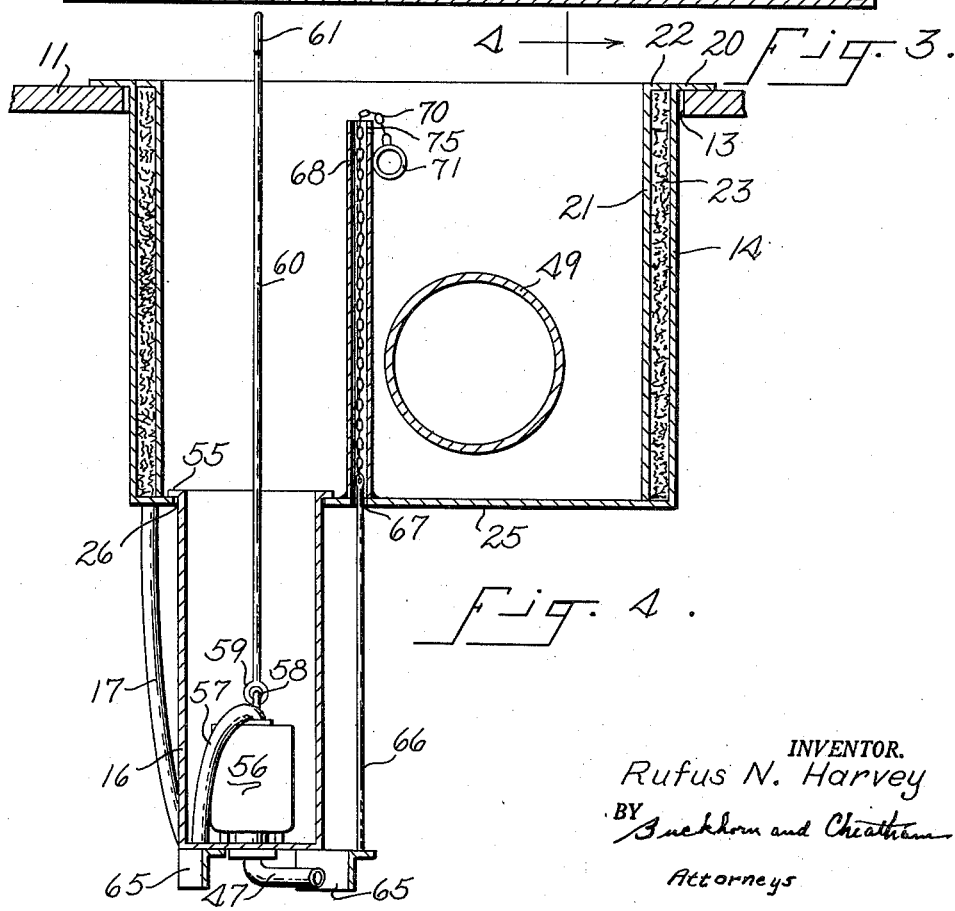
INVENTOR.
Rufus N. Harvey
BY Buckhorn and Cheatham
Attorneys Patented Sept. 26, 1950

2,523,569

UNITED STATES PATENT OFFICE 2,523,569

TRAILER HEATER

Rufus N. Harvey, Parkland, Wash.

Application December 10, 1948, Serial No. 64,624

11 Claims. (Cl. 237—31)

The present invention relates to heating equipment of particular utility in a house trailer or similar mobile apparatus.

The principal object of the present invention is to provide a floor furnace type of circulating heater for use in a mobile trailer, which floor furnace heater comprises telescoping sections whereby the burner may be lowered beneath the floor of the trailer to a considerable extent when the heating equipment is in operation, but may be elevated and telescoped with the radiating part of the furnace when the trailer is in motion so as to prevent damage to the equipment by high-crowned roads or projections on the ground.

A principal object of the present invention is to provide equipment of the foregoing type which is efficient in operation and easily movable from extended to retracted position.

A further object of the present invention is to provide such a heater which may be elevated to its inoperative position without danger of suffocating gases being released or explosions occurring should the burner portion be telescoped within the radiator portion while the fire is still burning.

A further object of the present invention is to provide a burner of the foregoing type which may be readily assembled and easily disassembled for inspection, and which is made of a minimum number of easily manufactured parts.

A further object of the present invention is to provide heating apparatus for a house trailer which is correctly insulated against the danger of wooden portions of the trailer becoming overheated and causing destruction of the trailer, and which is proof against the escape of noxious or explosive gases into the trailer.

The objects and advantages of the present invention will be more readily ascertained by inspection of the following specification taken in connection with the accompanying drawings wherein like numerals refer to like parts throughout, while the features of novelty will be more distinctly pointed out in the appended claims.

In the drawings Fig. 1 is a vertical section through a schematic representation of a trailer having the present invention applied thereto;

Fig. 3 is a horizontal section through the heating equipment taken substantially along line 3—3 of Fig. 2; and Fig. 4 is a vertical section taken substantially along line 4—4 of Fig. 3.

Figures 1, 2:
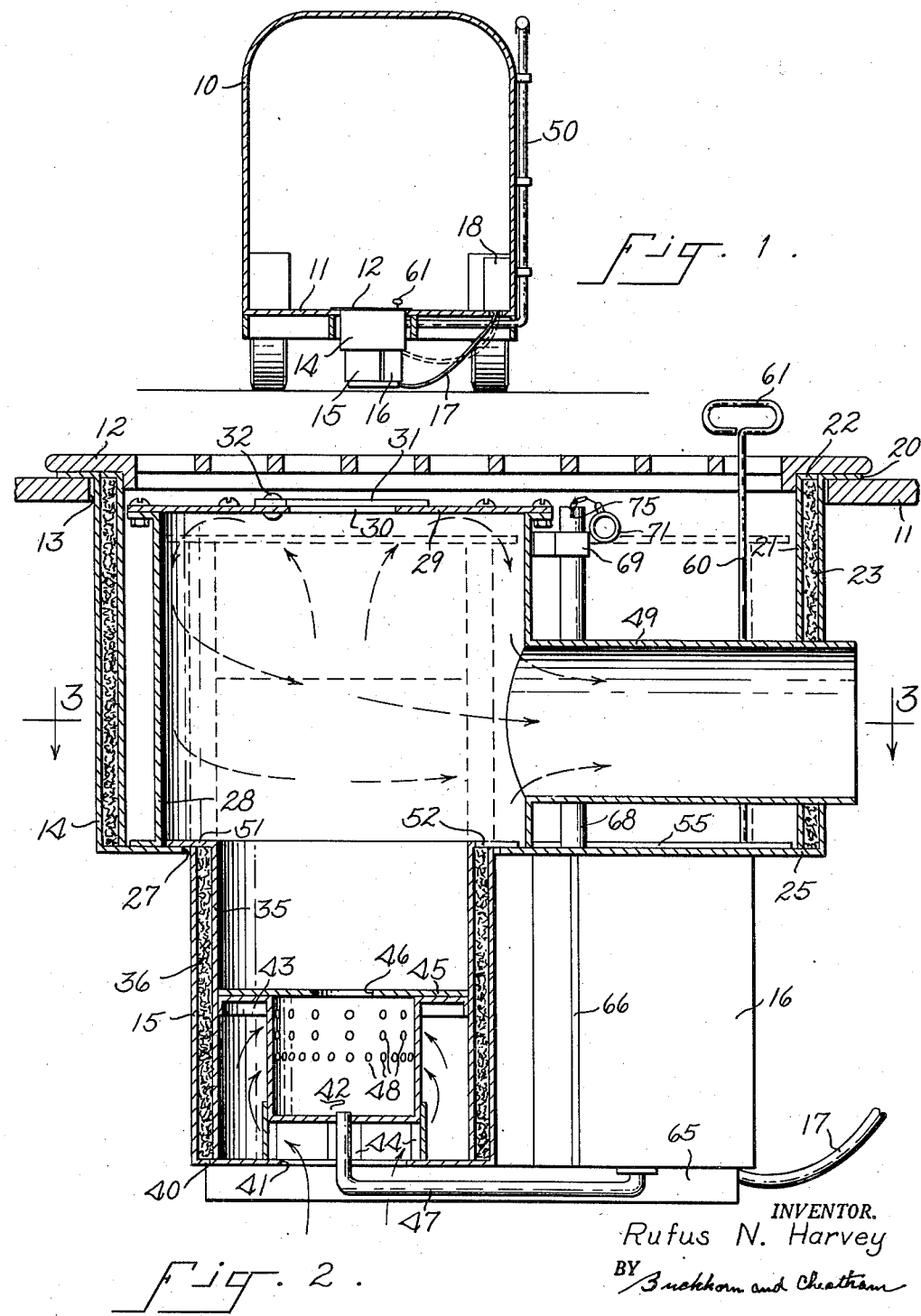
Fig. 2 is a vertical section through the heating equipment taken substantially along line 2—2 of Fig. 1.

The invention is illustrated in its position of use in Fig. 1 wherein a trailer 10 having a floor 11 is provided with a grill 12 covering the heating equipment opening 13, in which is suspended a floor furnace box 14. A burner chamber 15 and a float valve housing 16 are telescopically mounted within the furnace 14 so as to be capable of movement from an elevated position shown in dotted outline in Fig. 2 to a lowered position shown in full line in Fig. 2. Fuel may be led to the float valve housing 16 through a flexible hose 17 connected with a tank 18 conveniently located within the trailer.

The floor furnace comprises an outer shell having a flange 20 adapted to fit over the rim of the opening 13. An inner shell 21 is fitted within the outer shell and has a flange 22 at its upper edge to enclose a space between the inner and outer shells within which a layer of insulating material 23 may be packed to prevent radiation of heat from the furnace. The outer shell is provided with a lower wall 25 within which is located a rectangular opening 26 and a round opening 27. Surrounding the opening 27 is a heat exchange chamber 28 extending from the lower wall to a position adjacent the upper edge of the furnace and which is provided with a laterally projecting top flange. A cover 29 is bolted to the top flange of the heat exchanger 28 and is provided with a central access opening 30. An access door 31 is pivotally mounted upon a pivot 32 so as to be laterally movable to permit access to the interior of the heating chamber so that a fire may be kindled within the fire pot to be described. When the furnace is in operation the door 31 is swung to cover the opening 30.

The heat exchanger 28 is of larger diameter than the diameter of opening 27 so that the inner shell 35 of the fire chamber 15 may project laterally beyond the outer shell thereof and rest upon the rim of opening 27 when the fire chamber is extended as shown in Fig. 2. A layer of insulating material 36 is placed between the two shells so as to prevent undue heat loss and overheating of surrounding materials such as grass growing from the ground or the wooden portions of the trailer. The outer shell of the fire chamber is provided with a bottom wall 40 within which is located a central air admission opening 41. A fire pot 42 of the perforated, evaporating type is positioned within the chamber 15, the pot preferably having a large top flange 43 tightly engaging the inner surface of the shell 35. The fire pot may be supported upon a plurality of legs 44 which engage the wall 40 around the rim of opening 41. A fire ring 45 rests upon the flange 43 and is provided with a central fire opening 46. Oil for combustion is admitted through a tube 47 and the air which is drawn through opening 41 passes through the perforations 48 of the fire pot to cause combustion of the ignited oil. The principles of such fire pots are well known and many different styles thereof may be incorporated in the present invention. The flame emerging from the opening 46 heats the heat exchanger 28 and the gases of combustion then pass through a laterally directed flue 49 which extends through one end of the furnace chamber 14. The flue is permanently connected to a chimney 50 which extends along an outer surface of the trailer to an elevated point.

The depth of the fire chamber 15 is less than the depth of the heat exchanger shell 28 so that if the fire chamber should be retracted while the fire is burning there would be a space beneath the upper plate 29 for the gases of combustion to escape. To permit such escape the upper flange 51 of the inner shell 35 is provided with a plurality of wide notches 52 through which the gases of combustion may escape downwardly around the outer shell of the fire chamber and into the flue 49 regardless of the position of the fire chamber.

The float valve housing 16 is a simple container provided with a flange 55 resting upon the rim of the opening 26 when the housing is lowered as illustrated. A suitable float valve 56 is mounted on the bottom wall of the housing 16 and is connected to an inlet tube 57, which is connected to flexible tube 17. The outlet from the float valve is connected to the tube 47 leading to the fire pot. As is well known in such devices, the rate of flow of fuel may be controlled by turning a control lever. The lever in this instance comprises a hook 58 with which may be engaged an eye 59 on a removable control rod 60 extending through the grill 12 and provided with a handle 61. The control rod may be removed so that the control handle will not provide a dangerous obstruction in the center of the trailer. If desired, the control rod could terminate beneath the grill 12 which would be provided with a hand-hole for access to the handle 61.

In order that the fire chamber 15 and float valve housing 16 may be elevated and lowered as a unit, the bottom wall 40 of the fire chamber and the bottom wall of the housing 16 are connected by a pair of angle bars 65. One of the angle bars 65 has a vertical rod 66 affixed thereto, the upper end of which extends through a small opening 67 in the lower wall 25 of the furnace body. A vertical tube 68 is fixed in position around the opening 67, the upper end thereof being supported as by means of a strap 69 fastened to the heat exchanger shell 28. An elevator chain 70 extends through the tube 68 and is connected to the upper end of rod 66. A ring 71 at the end of the chain prevents the chain from dropping through the tube 68. The ring 71 may be engaged and the fire pot chamber and housing elevated until the angle bars 65 engage the bottom wall 25. The upper end of the tube 68 is preferably provided with a notch 75 in which a link of the chain 70 may be engaged to hold the extensible portion in its elevated position while the trailer is being moved about.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In combination with a house trailer having an opening in the floor thereof, a floor furnace mounted in said opening and extending below the floor, a heat exchanger within said floor furnace and having an opening in the bottom thereof, a fire chamber telescopically mounted in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, and means for admitting oil and air into said burner.

2. In combination with a house trailer having an opening in the floor thereof, a floor furnace mounted in said opening and extending below the floor, a heat exchanger within said floor furnace and having an opening in the bottom thereof, a fire chamber telescopically mounted in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, and means for admitting oil and air into said burner, said fire chamber having an overhanging flange for engaging the rim of the opening in said heat exchanger when the fire chamber is lowered.

3. In combination with a house trailer having an opening in the floor thereof, a floor furnace mounted in said opening and extending below the floor, a heat exchanger within said floor furnace and having an opening in the bottom thereof, a fire chamber telescopically mounted in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, and means for admitting oil and air into said burner, said fire chamber having an overhanging flange for engaging the rim of the opening in said heat exchanger when the fire chamber is lowered, and said flange having openings therethrough for permitting the escape of products of combustion into said flue should the fire chamber be elevated before the fire is extinguished.

4. In combination with a house trailer having an opening in the floor thereof, a floor furnace mounted in said opening and extending below the floor, a heat exchanger within said floor furnace and having an opening in the bottom thereof, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, means for admitting air into said burner, a second opening in the bottom of said floor furnace, a float valve housing telescopically mounted in said second opening, a float valve mounted in said housing and connected to said burner, and means rigidly connecting said fire chamber and said housing.

5. In combination with a house trailer having an opening in the floor thereof, a floor furnace mounted in said opening and extending below the floor, a heat exchanger within said floor furnace and having an opening in the bottom thereof, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, means for admitting air into said burner, a second opening in the bottom of said floor furnace, a float valve housing telescopically mounted in said second opening, a float valve mounted in said housing and connected to said burner, and means rigidly connecting said fire chamber and said housing, said connecting means comprising structural members engageable with the bottom of said floor furnace to limit telescoping movement of said fire chamber and housing.

6. In combination with a house trailer having an opening in the floor thereof, a floor furnace mounted in said opening and extending below the floor, a heat exchanger within said floor furnace and having an opening in the bottom thereof, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, means for admitting air into said burner, a second opening in the bottom of said floor furnace, a float valve housing telescopically mounted in said second opening, a float valve mounted in said housing and connected to said burner, means rigidly connecting said fire chamber and said housing, said connecting means comprising structural members engageable with the bottom of said floor furnace to limit telescoping movement of said fire chamber and housing, a vertical rod connected to said connecting means and extending into said floor furnace, a vertical tube fixed in said floor furnace in position telescopically to receive said rod, and a flexible elevating element connected to said rod and extending through said vertical tube.

7. A furnace adapted to be suspended in an opening in the floor of a structure, a heat exchanger within said furnace and having an opening in the bottom thereof, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, and means for admitting oil and air into said burner, said fire chamber having an overhanging flange for engaging the rim of the opening in said heat exchanger when the fire chamber is lowered.

8. A furnace adapted to be suspended in an opening in the floor of a structure, a heat exchanger within said furnace and having an opening in the bottom thereof, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, and means for admitting oil and air into said burner, said fire chamber having an overhanging flange for engaging the rim of the opening in said heat exchanger when the fire chamber is lowered, said flange being provided with notches for permitting the escape of products of combustion into said flue should the fire chamber be elevated before the fire is extinguished.

9. A furnace adapted to be suspended in an opening in the floor of a structure, a heat exchanger within said furnace and having an opening in the bottom thereof, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, means for admitting air into said burner, a second opening in the bottom of said furnace, a float valve housing telescopically mounted in said second opening, a float valve mounted in said housing and connected to said burner, and means rigidly connecting said fire chamber and said housing.

10. A furnace adapted to be suspended in an opening in the floor of a structure, a heat exchanger within said furnace and having an opening therethrough, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, means for admitting air into said burner, a second opening in the bottom of said furnace, a float valve housing telescopically mounted in said second opening, a float valve mounted in said housing and connected to said burner, and means rigidly connecting said fire chamber and said housing, said connecting means comprising structural members engageable with the bottom of said furnace to limit telescoping movement of said fire chamber and housing.

11. A furnace adapted to be suspended in an opening in the floor of a structure, a heat exchanger within said furnace and having an opening in the bottom thereof, a fire chamber telescopically mounted in the opening in said heat exchanger for vertical movement with respect thereto from an elevated position within the confines of said heat exchanger to a lowered position projecting from the bottom of said heat exchanger, said fire chamber opening upwardly into said heat exchanger, a flue communicating with the side of said heat exchanger below the upper end of said fire chamber when in elevated position, a vaporizing type oil burner mounted in said fire chamber, means for admitting air into said burner, a second opening in the bottom of said furnace, a float valve housing telescopically mounted in said second opening, a float valve mounted in said housing and connected to said burner, means rigidly connecting said fire chamber and said housing, said connecting means comprising structural members engageable with the bottom of said furnace to limit telescoping movement of said fire chamber and housing, a vertical rod connected to said connecting means and extending into said furnace, a vertical tube fixed in said furnace in position telescopically to receive said rod, and a flexible elevating element connected to said rod and extending through said vertical tube.

RUFUS N. HARVEY.

REFERENCES CITED

The following references are of record in the file of this patent:

UNITED STATES PATENTS

| Number | Name | Date |
|---|---|---|
| Re. 21,740 | Vullings | Mar. 4, 1941 |
| 429,237 | Hall | June 3, 1890 |

FOREIGN PATENTS

| Number | Country | Date |
|---|---|---|
| 183,039 | Germany | Apr. 2, 1907 |